United States Patent
Monajemi et al.

(10) Patent No.: US 11,903,063 B2
(45) Date of Patent: Feb. 13, 2024

(54) COMPLETE BASIC SERVICE SET (BSS) UPDATE REPORT INDICATION FOR MULTI-LINK DEVICE (MLD) ACCESS POINTS

(71) Applicant: Cisco Technology, Inc., San Jose, CA (US)

(72) Inventors: Pooya Monajemi, San Francisco, CA (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 374 days.

(21) Appl. No.: 17/360,016

(22) Filed: Jun. 28, 2021

(65) Prior Publication Data
US 2022/0150724 A1    May 12, 2022

Related U.S. Application Data (60) Provisional application No. 63/111,210, filed on Nov. 9, 2020.

(51) Int. Cl.
*H04W 76/15* (2018.01)
*H04W 24/02* (2009.01)
(Continued)

(52) U.S. Cl.
CPC ............ *H04W 76/15* (2018.02); *H04W 24/02* (2013.01); *H04W 88/10* (2013.01); *H04W 48/12* (2013.01); *H04W 84/12* (2013.01)

(58) Field of Classification Search
CPC ..... H04W 76/15; H04W 24/02; H04W 88/10; H04W 48/12; H04W 84/12
See application file for complete search history.

(56) References Cited

U.S. PATENT DOCUMENTS

| | | |
|---|---|---|
| 2008/0280621 A1 | 11/2008 | Soomro et al. |
| 2015/0036619 A1 | 2/2015 | Nishimura et al. |

(Continued)

FOREIGN PATENT DOCUMENTS

WO   WO-2022025520 A1  *  2/2022

OTHER PUBLICATIONS

Edward Au, "Specification framework for TGbe", IEEE P802.11 Wireless LANs, doc: IEEE 802.11-19/1262r23, Jan. 17, 2021, 116 pages.

(Continued)

*Primary Examiner* — Nam T Huynh
(74) *Attorney, Agent, or Firm* — Edell, Shapiro & Finnan, LLC (57) ABSTRACT

A method is provided in which an AP of a MLD AP device may decide to include all out-of-link BSS parameters updates in a beacon frame (beacon). A flag is included in the beacon frame to indicate that all updates are included in the beacon frame and thus the client device that receives the beacon frame should not send probe request frames (probe requests) to obtain these updates. Thus, a non-AP MLD that receives a beacon frame with the above indication and that has all critical BSS parameters corresponding to the Change Sequence Number (CSN) that preceded the updates indicated by the AP, should not send probe requests to obtain the updated parameters. The number of bits to assign to the complete BSS Update Report Indication flag may vary depending on the number of updates to be reported.

20 Claims, 8 Drawing Sheets

(51) Int. Cl.
  *H04W 88/10* (2009.01)
  *H04W 84/12* (2009.01)
  *H04W 48/12* (2009.01)

(56) References Cited

U.S. PATENT DOCUMENTS

| | | |
|---|---|---|
| 2018/0110046 A1 | 4/2018 | Patil et al. |
| 2019/0158413 A1 | 5/2019 | Patil et al. |
| 2020/0059858 A1 | 2/2020 | Liu et al. |
| 2023/0156492 A1* | 5/2023 | Gan ........................ H04L 5/001 370/329 |

OTHER PUBLICATIONS

Ming Gan, et al., "MLO: BSS parameter update", IEEE P802.11, Wireless LANs, doc.: IEEE 802.11-18/0149r06, Aug. 20, 2020, 3 pages.

Abhishek Patil, et al., "MLO Indication of Critical Updates", doc.: IEEE 802.11-20/0586r7, Apr. 15, 2020, 19 pages.

* cited by examiner

COMPLETE BASIC SERVICE SET (BSS) UPDATE REPORT INDICATION FOR MULTI-LINK DEVICE (MLD) ACCESS POINTS

CROSS REFERENCE TO RELATED APPLICATION

This application claims priority to U.S. Provisional Patent Application No. 63/111,210, filed Nov. 9, 2020, the entirety of which is incorporated herein by reference.

TECHNICAL FIELD

The present disclosure relates to wireless networking.

BACKGROUND

In IEEE 802.11be Multi-Link Device (MLD) operation, the TGbe task group has proposed mechanisms for a first Access Point (AP) of a MLD AP device to notify clients that Basic Service Set (BSS) parameters of a second AP of the same MLD AP device have been updated. Once an MLD client that has a link setup with the first AP is notified of the update, the MLD client needs to receive the updated parameters by one of several means, which includes the probe request/probe response mechanism. The updated parameters may also be included in the transmitted beacon frame by the first AP, but this may lead to unwanted beacon bloat.

DESCRIPTION OF EXAMPLE EMBODIMENTS

Overview

Presented herein are techniques to reduce probing behavior by the MLD clients while at the same time addressing a beacon frame bloat issue. A method is provided in which an AP of a MLD AP device may decide to include all out-of-link BSS parameters updates in a frame (beacon). A flag is included in the frame to indicate that all updates will be communicated and thus the client device that receives the frame should not send probe request frames (probe requests) to obtain these updates. Thus, a non-AP MLD that receives a frame with the above indication and that has all critical BSS parameters corresponding to the Change Sequence Number (CSN) that preceded the updates indicated by the AP, should not send probe requests to obtain the updated parameters. The number of bits to assign to the complete BSS Update Report Indication flag may be 1 (one update), 2 (up to 3 updates), or more (for more updates).

In one form, a method is provided that is performed by a MLD wireless access point apparatus that serves at least a first basic service set by a first access point and a second basic service set by a second access point. The method includes determining to provide at least one out of-link parameters update for the first basic service set served by the MLD wireless access point apparatus; generating a frame that includes the at least one out-of-link parameters update for the first basic service set and a flag to indicate whether out-of-link parameters updates for the first basic service set will be communicated; and transmitting the frame by the second access point in the second basic service set. In one form, the frame that includes the flag is a beacon frame, and the beacon frame includes the at least one out-of-link parameters update for the first basic service set. In another form, the flag indicates that the second access point will be sending, after the frame, another frame (such as an unsolicited probe response) that includes all out-of-link parameters of all links served by the MLD wireless access point apparatus.

Example Embodiments

Multi-link Device (MLD) is a relatively new concept introduced in IEEE 802.11be in which a device creates associations and multiple links. An MLD AP has radios active on several links (e.g., two or more links on one or more of 2.4 GHz, 5 GHz, 6 GHz, etc.) and a client device may have independent radios active on multiple links.

Figure 1:
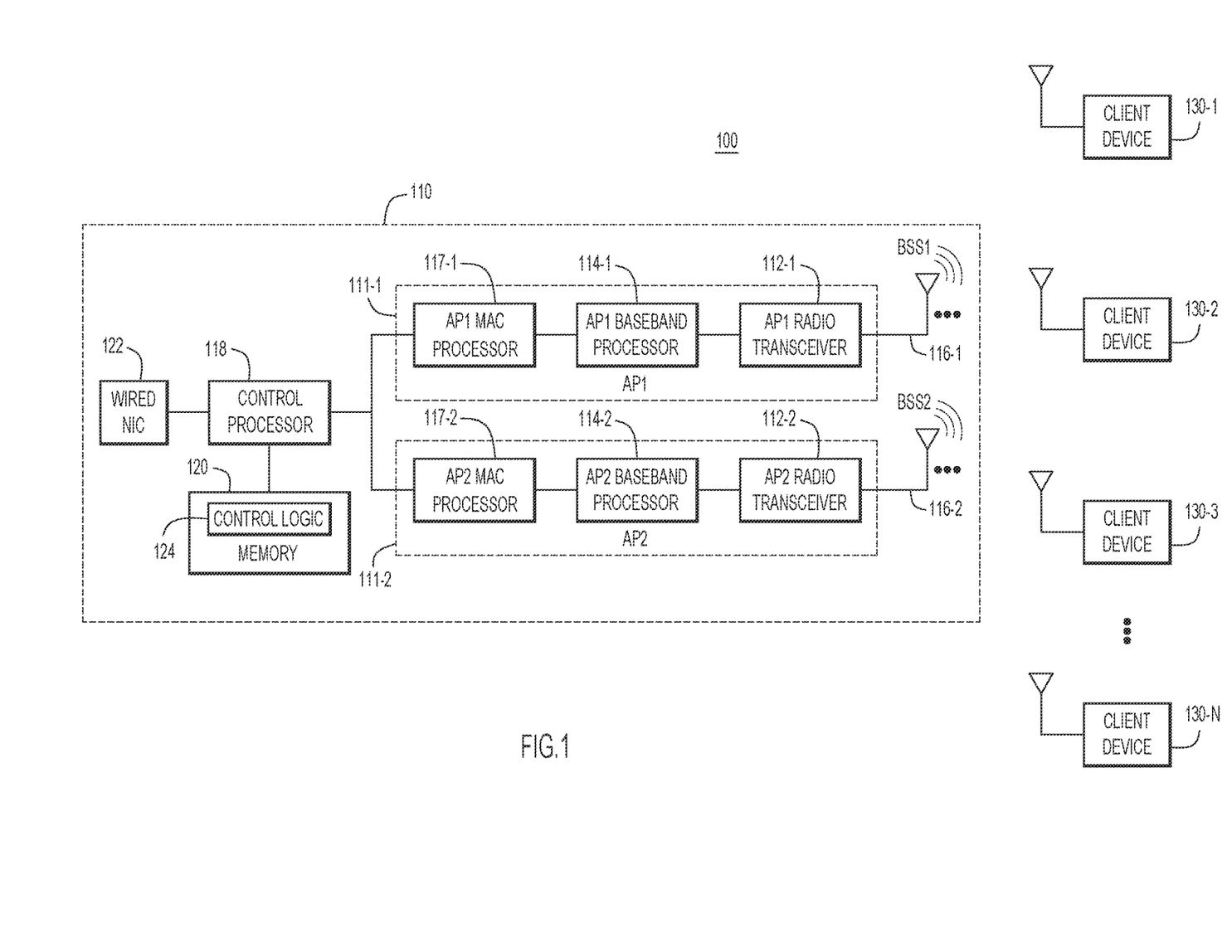
FIG. 1 is a system diagram illustrating a MLD AP device that serves multiple BSS's and which is configured to perform the BSS update notification techniques presented herein, in accordance with an example embodiment.

Referring to FIG. 1, a block diagram is shown of a system 100 that includes a MLD AP device 110 that serves a plurality of client devices 130-1, 130-2, 130-3 to 130-N. The MLD AP device 110 includes two APs (AP1 and AP2) 111-1 and 111-2, respectively, each having its own radio transceiver and baseband processor/modem and potentially medium access control (MAC) processor. For example, MLD AP device 110 includes a first radio transceiver (called AP1 radio transceiver) 112-1 and a first baseband processor 114-1 (called AP1 baseband processor) for AP1, and MLD AP device 110 includes a second radio transceiver (AP2 radio transceiver) 112-2 and a second baseband processor (AP2 baseband processor) 114-2 for AP2. AP1 radio transceiver 112-1 transmits and receives via one or more antennas 116-1, and likewise AP2 radio transceiver 112-2 transmits and receives via one or more antennas 116-2. There is a MAC processor 117-1 in AP 111-1 and a MAC processor 117-2 in AP 111-2, each to perform MAC layer processing for the respective AP 111-1 and 111-2.

The MLD AP device 110 further includes a control processor 118, memory 120 and a wired network interface card (NIC) 122. The memory 120 stores instructions for control logic 124. The control logic 124, when executed by the control processor 118, causes the control processor 118 to perform the operations of MLD AP device 110 described herein; or the functions described herein may be performed by the MAC processors 117-1 and 117-2 if present, or divided across the control processor 118 and MAC processors 117-1 and 117-2, if present.

AP1 wirelessly communicates on a first Basic Service Set (BSS), denoted BSS1, and AP2 wirelessly communicates on a second BSS, denoted BSS2. In one example, AP1 111-1 operates in a first frequency band, e.g., the 2.4 GHz band and AP2 111-2 operates in a second frequency band, e.g., the 5 GHz band. However, this is only an example. It is also possible that AP1 and AP2 operate in the same frequency band, but on different channels in the same frequency bands. Moreover, each AP 111-1 and 111-2 can serve multiple BSSs, but for simplicity and purposes of this description, each is serving one BSS.

Some of the client devices 130-1 to 130-N have multiple independent radios, similar to MLD AP device 110, and can therefore simultaneously operate on multiple links, e.g., with AP1 111-1 and AP2 111-2. For example, a 2.4 GHz radio of a client device can communicate with a 2.4 GHz radio of an AP1 independently of a 5 GHz radio of the client device communicating with 5 GHz radio of an AP2. There are also variations in which a client device has only a single radio and can switch between links in any band. Still another variation is a client device that has limited receive capability on other links while it is receiving on one link. There is also a case in which a client device has multiple radio transceivers and baseband processors, but decides to shut down one radio transceiver/baseband processor combination, to sleep or conserve power.

If a client device is active on only one link, there is a challenge as to how the client device can receive update information, in advance, about changes to one or more parameters in the other band(s)/links, such as any BSS parameters that the AP normally advertises on only that band. If a client device is only awake in one band/link, e.g., the 2.4 GHz band, and then there are changes on another link in the 5 GHz band, the AP would normally advertise in the 5 GHz band about such changes, but a client device asleep on that band/link is not going to get notified of the changes about the link in the 5 GHz band.

In a wireless local area network that involves operations of MLD APs and client devices, such as that shown in FIG. 1, an out-of-link BSS parameter has been proposed. An AP of an MLD AP device transmits a Change Sequence Number (CSN) for each of the other APs belonging to the same MLD AP device. For example, AP2 111-2 may transmit a CSN together with out-of-link BSS parameter updates associated with BSS1 used by AP1 111-1. The CSN is updated to notify a client device that another link, e.g., AP1, of the MLD AP device has had updates in critical BSS parameters. Once notified of an update, the client device/station (STA) may obtain the out-of-link updates from multiple sources including, on-link beacons, out-of-link beacons, and probe requests. Examples of BSS parameters that may be updated from time-to-time include Wi-Fi Multimedia (WMM) or Enhanced Distributed Channel Access (EDCA) parameters, (Extended) Channel Switch Announcement, Transmit Power Control element, etc.

Figure 2:
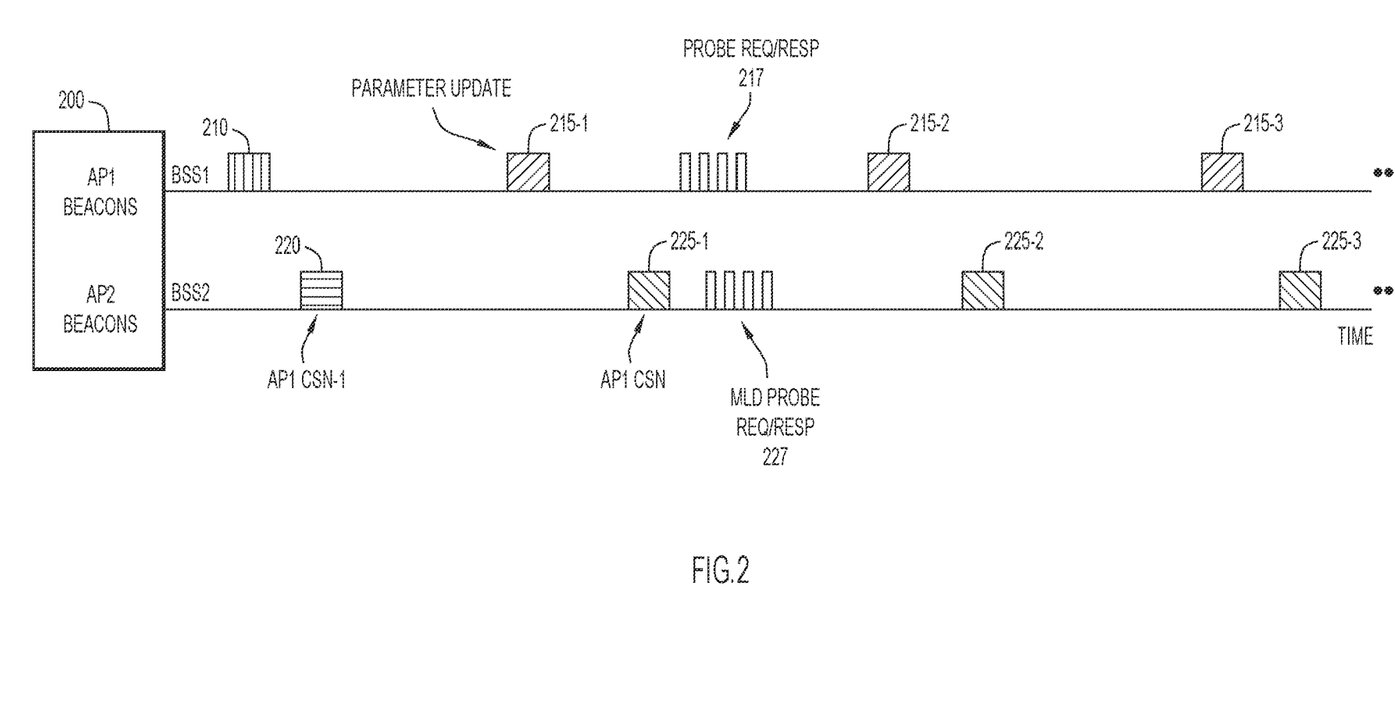
FIG. 2 is a diagram depicting how a probe storm problem can occur when many clients send probe requests to obtain updated BSS parameters.
Figure 3:
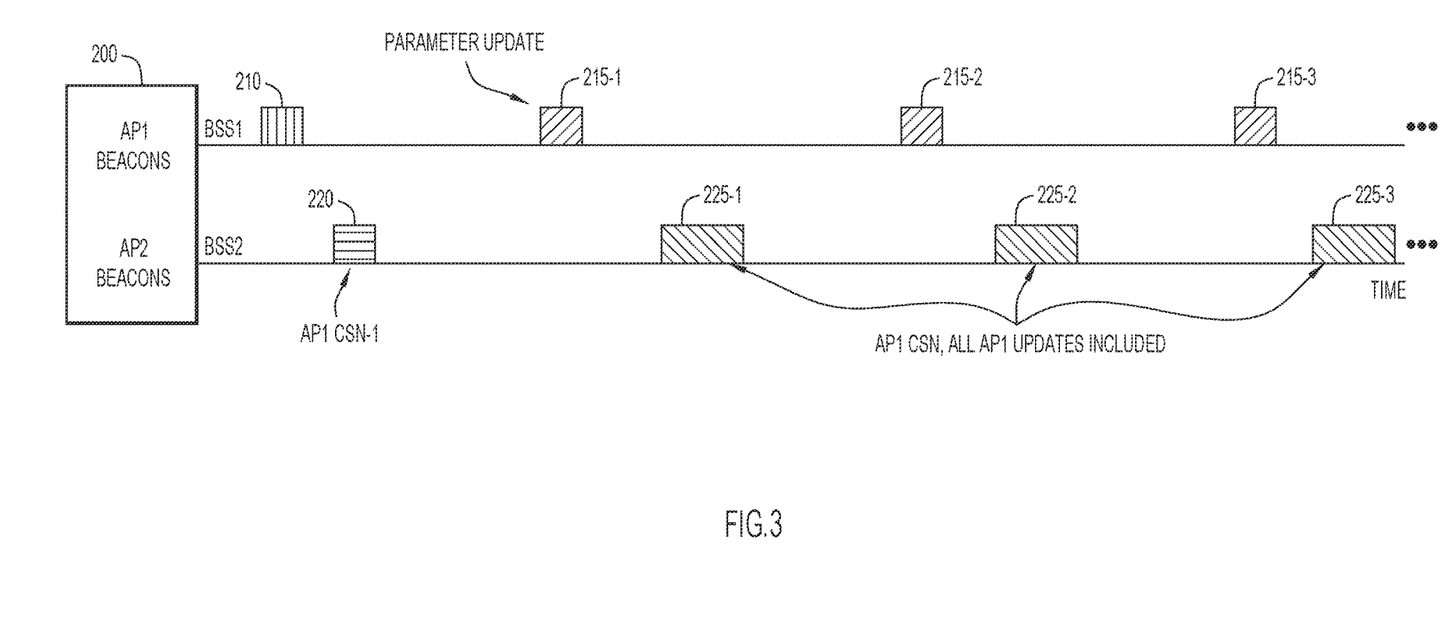
FIG. 3 is a diagram depicting how beacons can become bloated with updated BSS parameters if such parameters are always included in beacons.

Reference is now made to FIGS. 2-5. In these figures, AP1 and AP2 are in the same physical box. That is, AP1 and AP2 are independent APs of a MLD AP device. They are co-resident inside the same device. FIGS. 2 and 3 illustrate problems that the solution presented herein overcomes. In FIGS. 2 and 3, an MLD AP device 200 is shown that has two APs, denoted AP1 and AP2, operating on separate links (either in the same or different frequency bands) for BSS1 and BSS2, respectively.

Probe Storm Problem

AP1 of MLD AP device 200 transmits a beacon frame at 210 with current BSS parameters, and therefore makes a change to its BSS parameters. AP1 sends the beacon frames 215-1, 215-2, 215-3, etc., on BSS1 and on the frequency channel that AP1 uses, and as a result, only client devices active on BSS1 will receive beacon frames 215-1, 215-2, 215-3, and receive the BSS parameter updates included in these beacon frames. In addition, as shown at 217, client devices on BSS1, after detecting the parameters update in beacon frame 215-1 may initiate a probe request/probe response mechanism to receive all BSS parameter updates for all links (BSS1 and BSS2).

Meanwhile, prior to the BSS parameters change by AP1, AP2 transmits a beacon frame 220 that includes an out-of-link BSS parameters update CSN-1 reflecting only the updates to BSS1 since the previous BSS parameters update made by AP1 (not shown in FIG. 2).

AP2 detects that AP1 has changed its BSS parameters (since AP1 and AP2 are within the same MLD AP device), and sends beacon frames 225-1, 225-2, 225-3, etc., that include a CSN indicating the change. If a client device was sleeping and was not receiving the updates from AP1, and the client device wants to wake up and start transmitting to AP1, it needs to get those updated BSS parameters.

AP2 sends updates about changes to the BSS1 of AP1, as part of MLD operation, so that any client devices that did not receive the updates from AP1, but were active/awake on BSS2, can get them from AP2. Thus, if a client devices needs to transmit in BSS1 of AP1, the client device is aware of parameter changes on BSS1 of AP1.

Once a client device detects a CSN in a beacon frame, the client device can send probes to get all of the updates for all the links. This is shown at 227 in FIG. 1. If there are numerous client devices operating, they all may individually send such probe requests to get these updates. Furthermore, an indication of an update in one link may cause many clients to send probe requests to obtain the updated parameters at the same time. Such a storm of probe requests can be very disruptive to the medium. This is shown in FIG. 2.

Probe Storm Prevention vs. Beacon Bloat

One solution is to include the updated parameters in the out-of-link beacons. This is shown in FIG. 3, where AP2 is always (indefinitely) including in its beacon frames 215-1, 215-2, 215-3, etc. information about changes that AP1 has made to its parameters. Client devices then do not need to send a probe request to obtain new parameters. However, if the updated parameters are always included, this may cause undesirable beacon bloat in which beacon frames become overloaded with out-of-link BSS parameter updates.

Indication of Complete Updates

Figure 4:
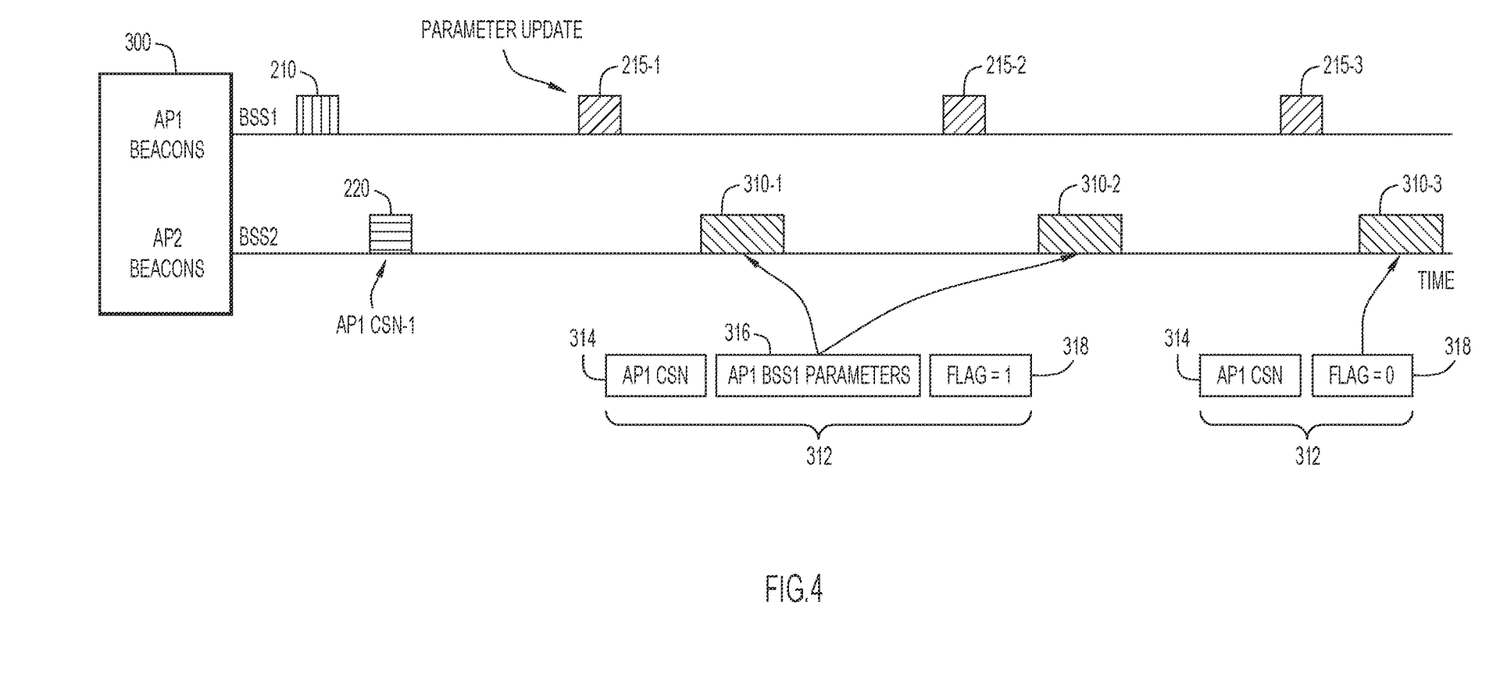
FIG. 4 is diagram that illustrates a solution in which an AP may decide to temporarily include in a beacon frame BSS parameter updates from another AP of the same MLD AP device, according to an example embodiment.

With reference to FIG. 4, a solution is provided according to the embodiments presented herein, in which an AP may decide to temporarily include all updated BSS parameters, since a previous update, from another AP of the same AP MLD in a beacon frame, that is, in a multi-link (ML) data element of a beacon frame). The scenario depicted in FIGS. 2 and 3 is repeated again in FIG. 4 as an example, where AP1 of a MLD AP device 300 has made BSS parameters updates for BSS1 and AP2 is to temporarily include those updates in beacon frames sent in BSS2. AP2 includes the BSS parameters updates for BSS1 since CSN-1, previous BSS parameters updates for BSS1, and AP2 does this for a limited amount of time, not indefinitely.

As shown in FIG. 4, when AP2 includes BSS parameters in beacon frames 310-1 and 310-2, a one-bit BSS Update Report Indication flag is set (FLAG=1) in a MLD data element 312 of the beacon frame to indicate that all out-of-link updates are included in the current beacon frame since the last time a BSS parameters update was indicated. Thus, the MLD data element 312 includes a field 314 that includes an indication of the current CSN for AP1, a field 316 containing the BSS1 parameters updates for AP1 and field 318 for a one-bit BSS Update Report Indication flag (FLAG). Again, in this example, since AP2 is including BSS1 Parameters Updates since the previous updates for BSS1 (CSN-1), the field 318 is set to 1. It should be understood that the beacon frames 310-1 and 310-2 may include other beacon frame content, not shown in FIG. 4, for simplicity.

Client devices active in BSS2 that receive beacon frames 310-1 and 310-2 will obtain all BSS parameters updates since CSN-1, and only need to decode the current beacon to obtain all updated parameters up to the current CSN. Those client devices do not need to send probe requests.

AP2 decides/determines when and for how long to include/repeat all out-of-link updates in beacon frames. Again, the out-of-link updates are included in beacon frames temporarily. AP2 may include complete update information for a few beacon periods so that most client devices in a sleep state receive the updates and do not send probe request frames for them. In the example of FIG. 4, AP2 sends the BSS1 parameters updates for 2 beacon frames, and then no longer includes the BSS1 parameters updates beginning with beacon frame 310-3. As a result, in beacon frame 310-3, the MLD data element 312 includes the current CSN for AP1 in field 314 and the FLAG is not set in field 318. At this point in time, non-AP client devices will have to obtain the BSS parameters updates by some other means.

Extending Beyond 1 CSN

Figure 5:
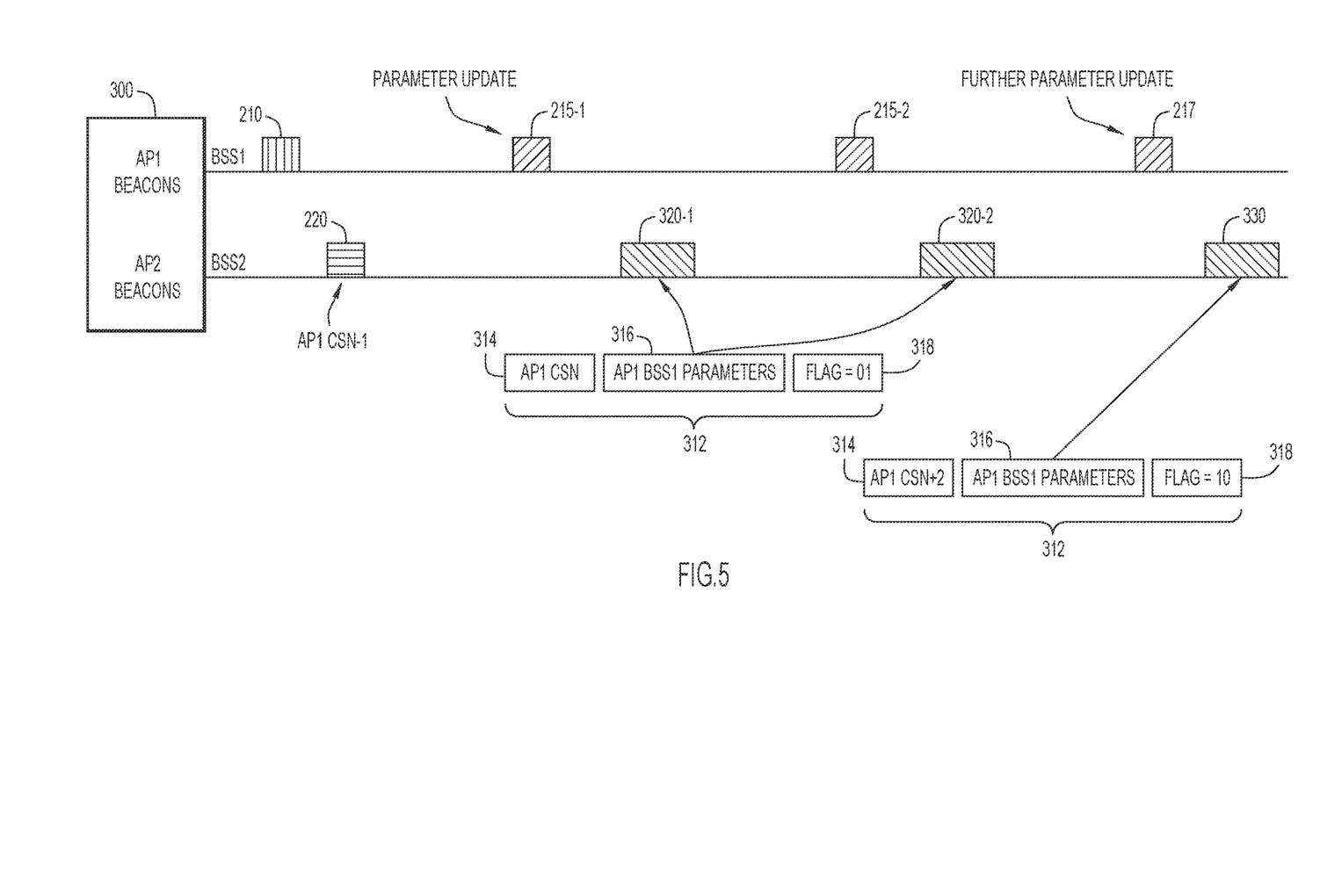
FIG. 5 is a diagram similar to FIG. 4, in which a flag is used to signal additional BSS parameter updates, according to an example embodiment.

Reference is now made to FIG. 5, which illustrates an extension of the solution depicted in FIG. 4. In a given BSS parameters update, any number of the previous updates may be included. To accommodate this, the BSS Update Report Indication FLAG in field 318 of the MLD data element 312 of a beacon frame has more than one bit. If only one bit is used for the FLAG, the AP can only signal complete updates since the previous updates, CSN-1. However, with a multiple-bit FLAG, it is possible to choose to assign more bits, in which case the AP can, in general, include all parameter updates since CSN-($2^N$-1), where N is the number of bits of the flag.

Thus, as shown in FIG. 5, in beacon frames 320-1 and 320-2, the field 314 is set to CSN+1 to indicate that the parameters of BSS1 changed, the AP1 BSS1 Parameters field 316 in the beacon frame will include all BSS1 parameter updates since one previous update, and the BSS Update Report Indication FLAG in field 318 is a two-bit field that is set to 01 to indicate that the BSS1 parameters included in field 316 are one update since CSN.

However, in beacon frame 330, AP2 includes two updates of BSS1 parameters since CSN. Thus, field 314 is set to CSN+2, field 316 includes all BSS1 parameters since CSN, and the BSS Update Report Indication FLAG in field 318 is set to 2 (encoded as 10) to indicate that the BSS Update Report Indication FLAG in field 318 holds two BSS1 parameters updates since CSN. AP1 will send further BSS parameter updates as shown in beacon frame 217.

Accordingly, a method is provided to include all out-of-link updates in a beacon. An AP may decide to report all out-of-link BSS parameter updates in a beacon frame. A flag is provided to indicate that all updates are included in the beacon and thus the client should not send probe requests to obtain these updates. Thus, a non-AP MLD that receives a beacon with the above indication and that has all critical BSS parameters corresponding to the CSN preceding that indicated by the AP, should not send probe requests to obtain the updated parameters. The number of bits to assign to the complete BSS Update Report Indication flag may be 1 (one update), 2 (up to 3 updates), or more (for more updates).

Furthermore, the techniques presented above may be used as part of a method for an AP to decide if and for how many beacons with complete updates of another AP are reported, as a function of one or more of: (a) number of client devices expected to probe (send probe requests), (b) amount of time or number of bytes to include the report in a beacon frame, (c) medium conditions such as channel utilization, and (d) associated client devices' sleep state and pattern on each link. For instance, the AP could first calculate the duration to reach most or all of its clients, via: a) the maximum measured or presumed sleep interval, b) the maximum remaining sleep interval based on the measured or presumed sleep interval, c) some multiple of the measured and presumed average sleep interval, d) some multiple of the remaining measured and presumed average sleep interval, e) some percentile of the measured and presumed sleep interval, f) some percentile of the remaining measured and presumed sleep interval, etc. Next, given that duration, the AP could then calculate the expected medium utilization for two options: A) the expected medium utilization of the probe requests/responses as the duration of the probe request/response exchanges times the number of client devices expected to probe, and B) the additional medium utilization per beacon of the extra fields times the number of beacons sent during the duration. Finally, the AP could select the option with the lower medium utilization.

Figure 6:
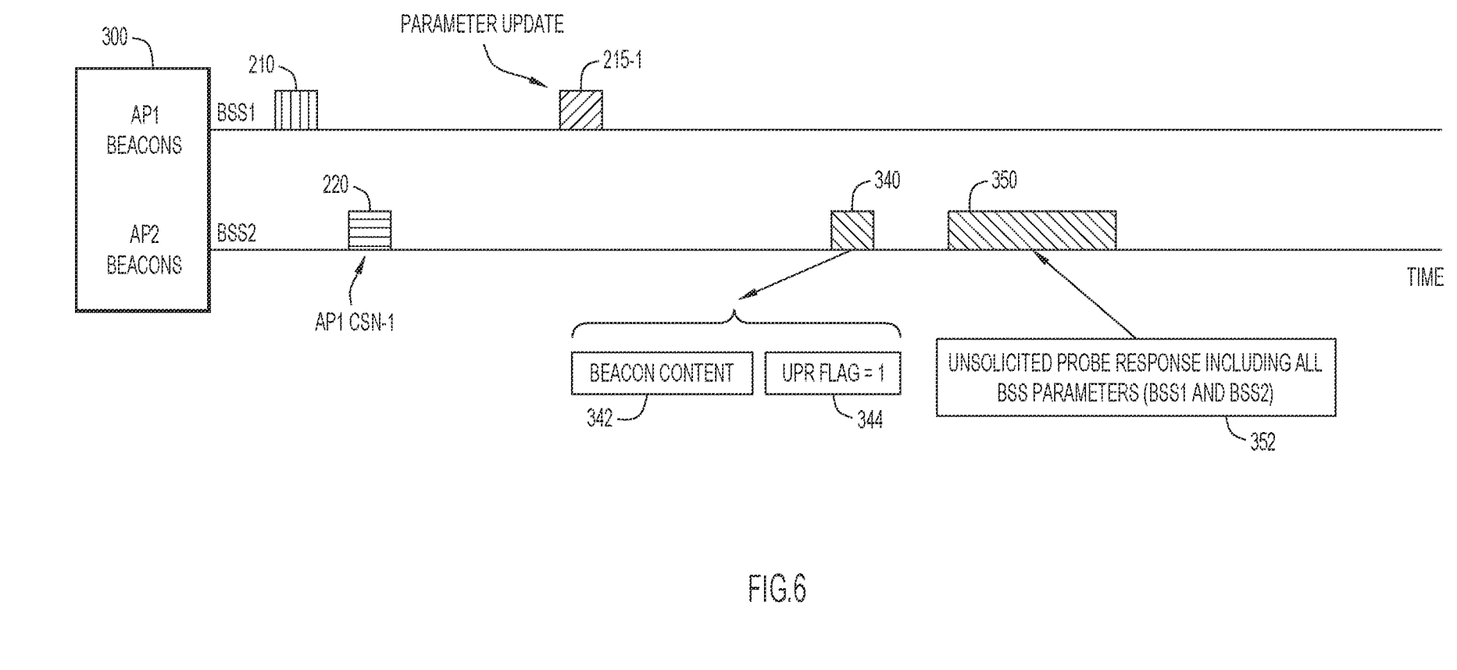
FIG. 6 is a diagram illustrating a technique for including in a beacon frame a flag to indicate a subsequent unsolicited probe response frame containing all BSS parameter updates for all links, according to an example embodiment.

Reference is now made to FIG. 6. FIG. 6 shows a scheme by which an MLD AP device may signal upcoming BSS parameter updates in a way to prevent or minimize the number of probe requests that client devices may send on a link. A given AP of a MLD AP device 300 may include in a (first) frame, e.g., a beacon frame, a flag to indicate that there will be subsequently communicated in another (a second) frame, e.g., an unsolicited probe response, sent after this (first) frame, all out-of-link parameters so that client devices that receive the (first) frame do not subsequently send a probe request. Specifically, AP2 sends a beacon frame 340 that includes one or more fields 342 of normal beacon frame content and a field 344 for an unsolicited probe response (UPR) flag that is set to 1 to indicate that AP2 is going to send, after the beacon frame 340, an unsolicited probe response frame 350 or some other frame, that includes, as shown at 352, all BSS parameters for all links served by the MLD AP device 300. The unsolicited probe response frame 350 may include all BSS parameters, not just updates since a previous update, for all links, e.g., BSS1 and BSS2.

Figure 7:
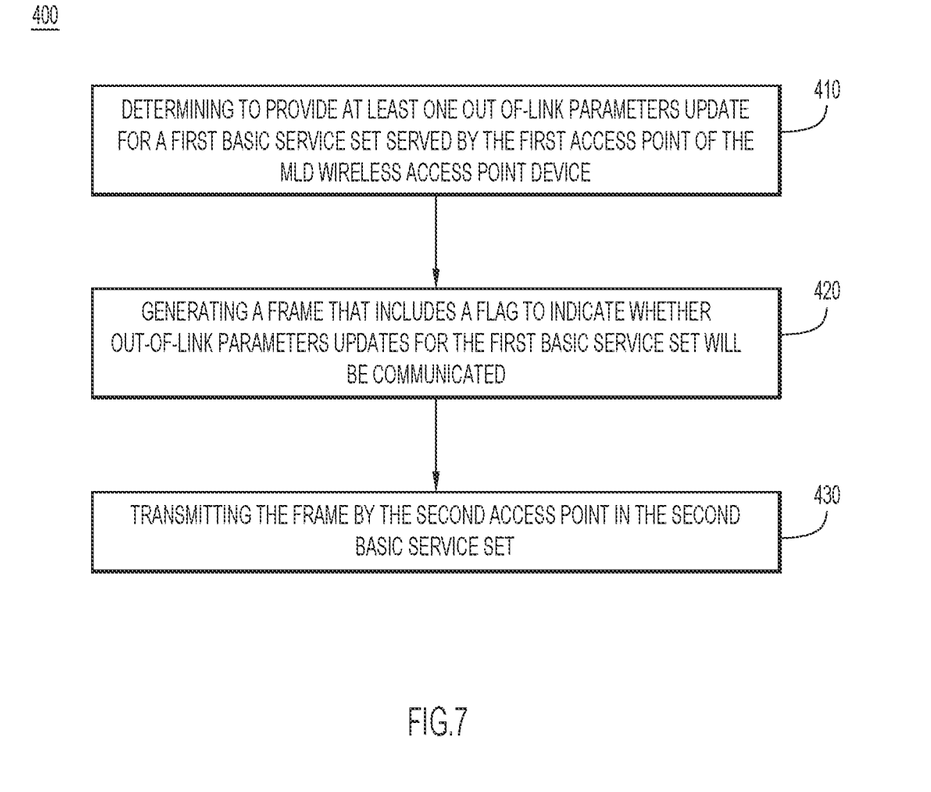
FIG. 7 is a flow chart depicting a method for sending BSS parameters updates from a MLD AP device, according to an example embodiment.

FIG. 7 is a flow chart depicting a method 400 performed by a MLD AP device to report out-of-link BSS parameter updates. In particular, the method 400 may be performed by a MLD wireless access point apparatus that simultaneously serves at least a first basic service set by a first access point and a second basic service set by a second access point. The method 400 includes a step 410 of determining to provide at least one out-of-link parameters update for the first basic service set served by the MLD wireless access point apparatus. At step 420, the method 400 involves generating a frame that includes a flag to indicate whether out-of-link parameters updates for the first basic service set will (imminently) be communicated. At step 430, the method 400 includes transmitting the frame by the second access point in the second basic service set.

When an out-of-link parameter update is provided, the update includes all changes of critical parameters such that a non-AP MLD that receives the at least one out-of-link parameters update need not send a probe request for the first basic service set. In addition, the "at least one" out-of-link parameters update is meant to include updates for one or multiple bands (e.g., updates for channels in both 5 GHz and 6 GHz bands) and/or multiple beacon parameter changes (e.g., changes during CSN+1 and CSN+2). In addition, an MLD AP may determine to not include any out-of-link parameters updates. For example, the MLD AP could stop sending the updated parameters if the MLD AP has detected that most/all clients have already woken up.

In one form, the frame is a beacon frame, and the beacon frame includes the at least one out-of-link parameters update for the first basic service set.

As explained above, the MLD wireless access point apparatus determines when and, temporarily, for how many beacon frames to include the at least one out-of-link parameters update for the first basic service set.

The MLD wireless access point apparatus may generate a particular beacon frame to not include any out-of-link parameters updates when it is determined to no longer include the at least one out-of-link parameters update, and wherein the flag included in the particular beacon frame indicates that no out-of-link parameters updates are included in the beacon frame. In one form, the flag may be a single bit that indicates that the out-of-link parameters updates included in the beacon frame are out-of-link parameters updates since a most recent parameters update made for the first basic service set. In another form, the flag is multiple bits and indicates a number of previous out-of-link parameters updates included in the beacon frame.

The MLD wireless access point may include in the beacon frame all out-of-link parameters updates since a change sequence number (CSN)–($2^N$–1), wherein N is a number of bits of the flag.

Further still, as depicted in FIG. 6, the flag in the frame may indicate that the second access point will be sending, after the (first) frame, another (a second) frame that includes all out-of-link parameters of all links served by the MLD wireless access point apparatus. The another (second) frame that includes all out-of-link parameters may be an unsolicited probe response, for example, or any other suitable frame type.

Figure 8:
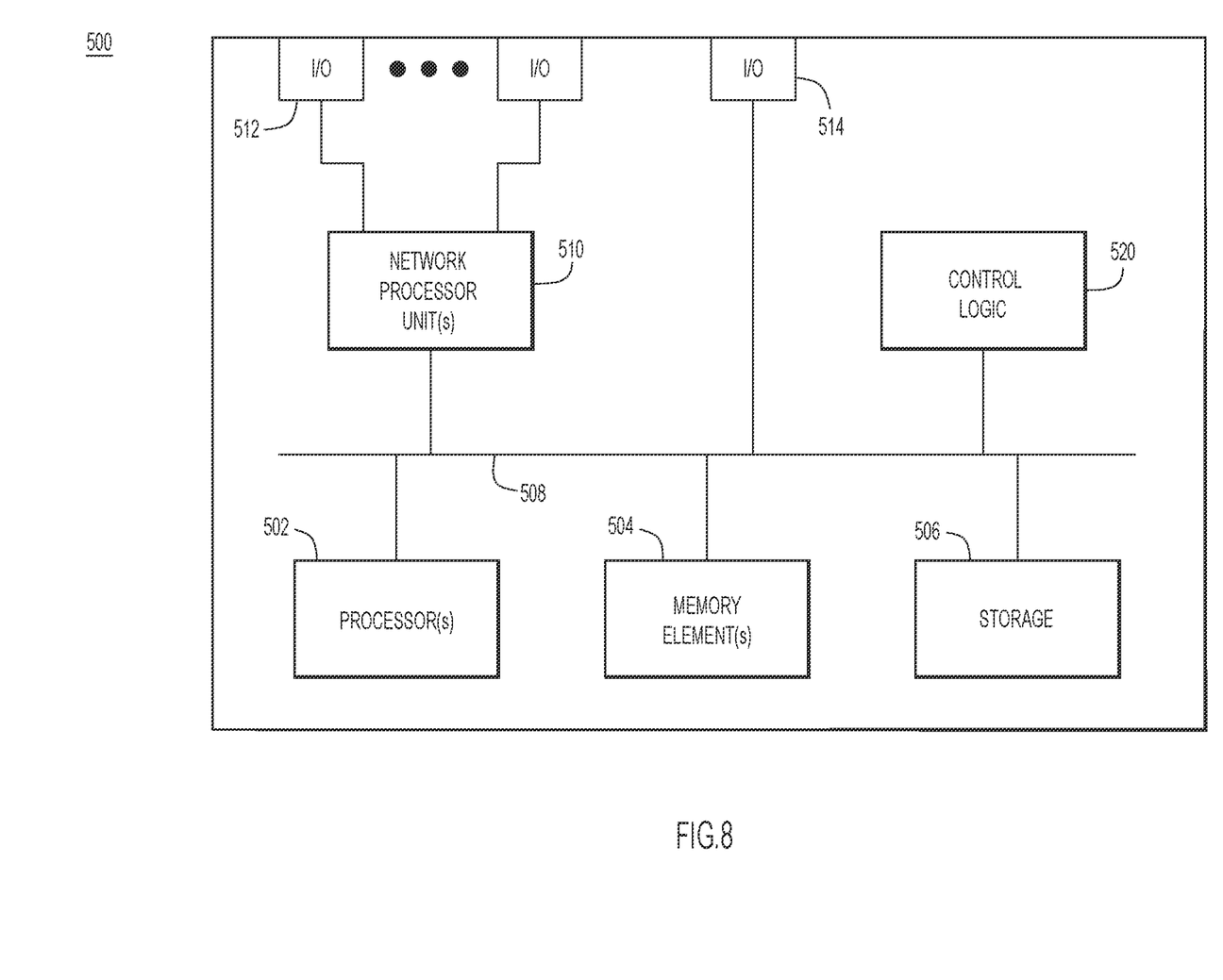
FIG. 8 is a hardware block diagram of a device, such as an MLD AP device, that may be configured to perform the operations presented herein.

Referring to FIG. 8, FIG. 8 illustrates a hardware block diagram of a computing device 500 that may perform functions associated with operations discussed herein in connection with the techniques depicted in FIGS. 4-7. In various embodiments, a computing device, such as computing device 500 or any combination of computing devices 500, may be configured as to perform the operations presented herein. In other words, an AP that performs the operations depicted in FIGS. 4-7 may take the form of the computing device 500 shown in FIG. 8.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, an out-of-link parameter update mechanisms are provided to address beacon bloats as well as probe storm problems.

In one form, a method is provided that is performed by a multi-link device (MLD) wireless access point apparatus that serves at least a first basic service set by a first access point and a second basic service set by a second access point, the method comprising: determining to provide at least one out of-link parameters update for the first basic service set served by the MLD wireless access point apparatus; generating a frame that includes a flag to indicate whether out-of-link parameters updates for the first basic service set will be communicated; and transmitting the frame by the second access point in the second basic service set.

In another form, an apparatus is provided comprising: a first wireless access point and second wireless access points each including a radio transceiver, a baseband processor and a media access control processor, wherein the first wireless access point is configured to serve a first basic service set and the second wireless access point is configured to serve a second basic service set; and a controller coupled to the first wireless access point and the second wireless access point; wherein one or more of the controller and the media access control processor of the second wireless access point is configured to: determine to provide at least one out of-link parameters update for the first basic service set; generate a frame that includes a flag to indicate whether out-of-link parameters updates for the first basic service set will be communicated; and cause the radio transceiver of the second wireless access point to transmit the frame.

In still another form, one or more computer readable storage media are provided, encoded with software comprising computer executable instructions and when the software is executed by processor in a multi-link device (MLD) wireless access point apparatus that serves at least a first basic service set by a first access point and a second basic service set by a second access point, cause processor to perform operations including: determining to provide at least one out of-link parameters update for the first basic service set; generating a frame that includes the at least one out-of-link parameters update for the first basic service set and a flag to indicate whether out-of-link parameters updates for the first basic service set will be communicated; and causing the second wireless access point to transmit the frame.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a multi-link device (MLD) wireless access point apparatus that serves at least a first basic service set by a first access point and a second basic service set by a second access point, the method comprising:
   determining to provide at least one out of-link parameters update for the first basic service set served by the MLD wireless access point apparatus;

generating a frame that includes a flag to indicate whether out-of-link parameters updates for the first basic service set will be communicated; and transmitting the frame by the second access point in the second basic service set.

2. The method of claim 1, wherein the at least one out-of-link parameters update includes all changes of parameters of the first basic service set such that a non-AP MLD that receives the at least one out-of-link parameters update need not send a probe request for the first basic service set.

3. The method of claim 1, wherein the frame is a beacon frame, and the beacon frame includes the at least one out-of-link parameters update for the first basic service set.

4. The method of claim 3, further comprising determining when and for how many beacon frames to include the at least one out-of-link parameters update for the first basic service set.

5. The method of claim 4, wherein generating comprises generating a particular beacon frame to not include any out-of-link parameters updates when it is determined to no longer include the at least one out-of-link parameters update, and wherein the flag included in the particular beacon frame indicates that no out-of-link parameters updates are included in the beacon frame.

6. The method of claim 3, wherein the flag is a single bit and indicates that the out-of-link parameters updates included in the beacon frame are out-of-link parameters updates since a most recent parameters update made for the first basic service set.

7. The method of claim 3, wherein the flag is multiple bits and indicates a number of previous out-of-link parameters updates included in the beacon frame.

8. The method of claim 7, wherein generating comprises including in the beacon frame all out-of-link parameters updates since a change sequence number $(CSN)-(2^N-1)$, wherein N is a number of bits of the flag.

9. The method of claim 1, wherein the flag in the frame indicates that the second access point will be sending after the frame, another frame that includes all out-of-link parameters of all links served by the MLD wireless access point apparatus.

10. The method of claim 9, wherein the another frame that includes all out-of-link parameters is an unsolicited probe response.

11. An apparatus comprising:
a first wireless access point and second wireless access points each including a radio transceiver, a baseband processor and a media access control processor, wherein the first wireless access point is configured to serve a first basic service set and the second wireless access point is configured to serve a second basic service set; and
a controller coupled to the first wireless access point and the second wireless access point;
wherein one or more of the controller and the media access control processor of the second wireless access point is configured to:
determine to provide at least one out-of-link parameters update for the first basic service set;
generate a frame that includes a flag to indicate whether out-of-link parameters updates for the first basic service set will be communicated; and cause the radio transceiver of the second wireless access point to transmit the frame.

12. The apparatus of claim 11, wherein the at least one out-of-link parameters update includes all changes of parameters of the first basic service set such that a non-AP MLD that receives the at least one out-of-link parameters update need not send a probe request for the first basic service set.

13. The apparatus of claim 11, wherein the frame is a beacon frame, and the beacon frame includes the at least one out-of-link parameters update for the first basic service set.

14. The apparatus of claim 13, wherein the controller or the media access control processor of the second wireless access point is configured to generate a particular beacon frame to not include any out-of-link parameters updates when it is determined to no longer include the at least one out-of-link parameters update, and wherein the flag included in the particular beacon frame indicates that no out-of-link parameters updates are included in the beacon frame.

15. The apparatus of claim 14, wherein the flag is a single bit and indicates that the out-of-link parameters updates included in the beacon frame are out-of-link parameters updates since a most recent parameters update made for the first basic service set.

16. The apparatus of claim 14, wherein the flag is multiple bits and indicates a number of previous out-of-link parameters updates included in the beacon frame.

17. The apparatus of claim 16, wherein the controller or the media access control processor of the second wireless access point is configured to include in the beacon frame all out-of-link parameters updates since a change sequence number $(CSN)-(2^N-1)$, wherein N is a number of bits of the flag.

18. The apparatus of claim 11, wherein the flag in the frame indicates that the second wireless access point will be sending another frame after the frame, the another frame including all out-of-link parameters of all links served by the apparatus.

19. One or more computer readable storage media encoded with software comprising computer executable instructions and when the software is executed by processor in a multi-link device (MLD) wireless access point apparatus that serves at least a first basic service set by a first access point and a second basic service set by a second access point, cause processor to perform operations including:
determining to provide at least one out of-link parameters update for the first basic service set;
generating a frame that includes the at least one out-of-link parameters update for the first basic service set and a flag to indicate whether out-of-link parameters updates for the first basic service set will be communicated; and
causing the second wireless access point to transmit the frame.

20. The one or more computer readable storage media of claim 19, wherein the at least one out-of-link parameters update includes all changes of parameters of the first basic service set such that a non-AP MLD that receives the at least one out-of-link parameters update need not send a probe request for the first basic service set.

* * * * *